(12) United States Patent
Qin et al.

(10) Patent No.: US 11,212,413 B2
(45) Date of Patent: Dec. 28, 2021

(54) LASER SCANNING UNIT IDENTIFICATION METHOD AND IMAGE FORMING DEVICE

(71) Applicant: Zhuhai Pantum Electronics Co., Ltd., Zhuhai (CN)

(72) Inventors: Zuliao Qin, Zhuhai (CN); Gang Wang, Zhuhai (CN); Xuan Tan, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 112 days.

(21) Appl. No.: 16/707,220

(22) Filed: Dec. 9, 2019

(65) Prior Publication Data

US 2020/0204699 A1 Jun. 25, 2020

(30) Foreign Application Priority Data

Dec. 24, 2018 (CN) .......................... 201811584629.X

(51) Int. Cl.
| | | |
|---|---|---|
| *H04N 1/113* | (2006.01) | |
| *G03G 15/04* | (2006.01) | |
| *G02B 26/12* | (2006.01) | |
| *G03G 15/043* | (2006.01) | |
| *G02B 27/00* | (2006.01) | |

(52) U.S. Cl.
CPC .......... *H04N 1/113* (2013.01); *G02B 26/121* (2013.01); *G03G 15/043* (2013.01); *G02B 27/0031* (2013.01)

(58) Field of Classification Search
CPC ................ G03G 15/043; G02B 26/121; G02B 27/0031; H04N 1/113
See application file for complete search history.

(56) References Cited

U.S. PATENT DOCUMENTS

| | | | |
|---|---|---|---|
| 2017/0285510 A1* | 10/2017 | Furuta | ................. G03G 15/043 |
| 2020/0096896 A1* | 3/2020 | Ozawa | ................. G03G 15/043 |
| 2020/0122483 A1* | 4/2020 | Tanaka | ................. G03G 15/043 |

* cited by examiner

*Primary Examiner* — Sophia S Chen
(74) *Attorney, Agent, or Firm* — Anova Law Group, PLLC

(57) ABSTRACT

A laser scanning unit (LSU) identification method and an image forming device are provided. The image forming device includes a processor and a target LSU, where the target LSU includes a laser diode, a laser diode drive unit, a polygon mirror, and a motor. The method includes providing a signal related to a quantity of reflective surfaces of the polygon mirror to the processor by the target LSU; identifying the quantity of the reflective surfaces of the polygon mirror of the target LSU according to the signal related to the quantity of the reflective surfaces of the polygon mirror provided by the target LSU, and determining a control parameter of the target LSU according to an identified quantity of the reflective surfaces by the processor, thereby controlling the target LSU according to the control parameter; and operating according to the control parameter by the target LSU.

12 Claims, 7 Drawing Sheets

LASER SCANNING UNIT IDENTIFICATION METHOD AND IMAGE FORMING DEVICE

CROSS-REFERENCE TO RELATED APPLICATION

This application claims the priority of Chinese Patent Application No. 201811584629.X, filed on Dec. 24, 2018, the content of which is incorporated herein by reference in its entirety.

TECHNICAL FIELD

The present disclosure generally relates to the field of image forming technology and, more particularly, relates to a laser scanning unit identification method and an image forming device.

BACKGROUND

An image forming device (e.g., a printer) has a laser scanning unit (LSU) for exposing a charged photosensitive drum. The LSU design specifications of different manufacturers may be inconsistent. It is required to configure different control parameters when the LSUs installed on the image forming devices have different specifications. Currently, the image forming devices may not automatically identify the specifications of the installed LSUs, that is, may not automatically be compatible with LSUs with different specifications.

SUMMARY

One aspect of the present disclosure provides a laser scanning unit (LSU) identification method of an image forming device. The image forming device includes a processor and a target LSU, where the target LSU includes a laser diode (LD), a laser diode (LD) drive unit, a polygon mirror, and a motor for driving the polygon mirror; and the target LSU is one of at least two LSU types having different quantities of reflective surfaces of the polygon mirrors. The method includes providing, by the target LSU, a signal related to a quantity of the reflective surfaces of the polygon mirror to the processor; identifying, by the processor, the quantity of the reflective surfaces of the polygon mirror of the target LSU according to the signal related to the quantity of the reflective surfaces of the polygon mirror provided by the target LSU; determining, by the processor, a control parameter of the target LSU according to an identified quantity of the reflective surfaces, thereby controlling the target LSU according to the control parameter; and operating, by the target LSU, according to the control parameter.

Another aspect of the present disclosure provides an image forming device. The image forming device includes a processor and a target LSU, where the target LSU includes a laser diode (LD), a laser diode (LD) drive unit, a polygon mirror and a motor for driving the polygon mirror; and the target LSU is one of at least two LSU types having different quantities of reflective surfaces of the polygon mirrors; and the processor is configured to: identify a quantity of reflective surfaces of the polygon mirror of the target LSU according to a signal related to the quantity of the reflective surfaces of the polygon mirror provided by the target LSU, and determine a control parameter of the target LSU according to an identified quantity of reflective surfaces, thereby controlling the target LSU of the image forming device according to the control parameter.

Other aspects of the present disclosure can be understood by those skilled in the art in light of the description, the claims, and the drawings of the present disclosure.

BRIEF DESCRIPTION OF THE DRAWINGS

In order to clearly illustrate the technical solutions in the embodiments of the present disclosure, the drawings, which are required to be used in the description of the disclosed embodiments, are briefly described hereinafter. It should be understood that the following drawings are merely some embodiments of the present disclosure and are not to be considered as the scope limitation. Other drawings derived from such drawings may be obtained by those skilled in the art without creative work.

DETAILED DESCRIPTION

Figure 1:
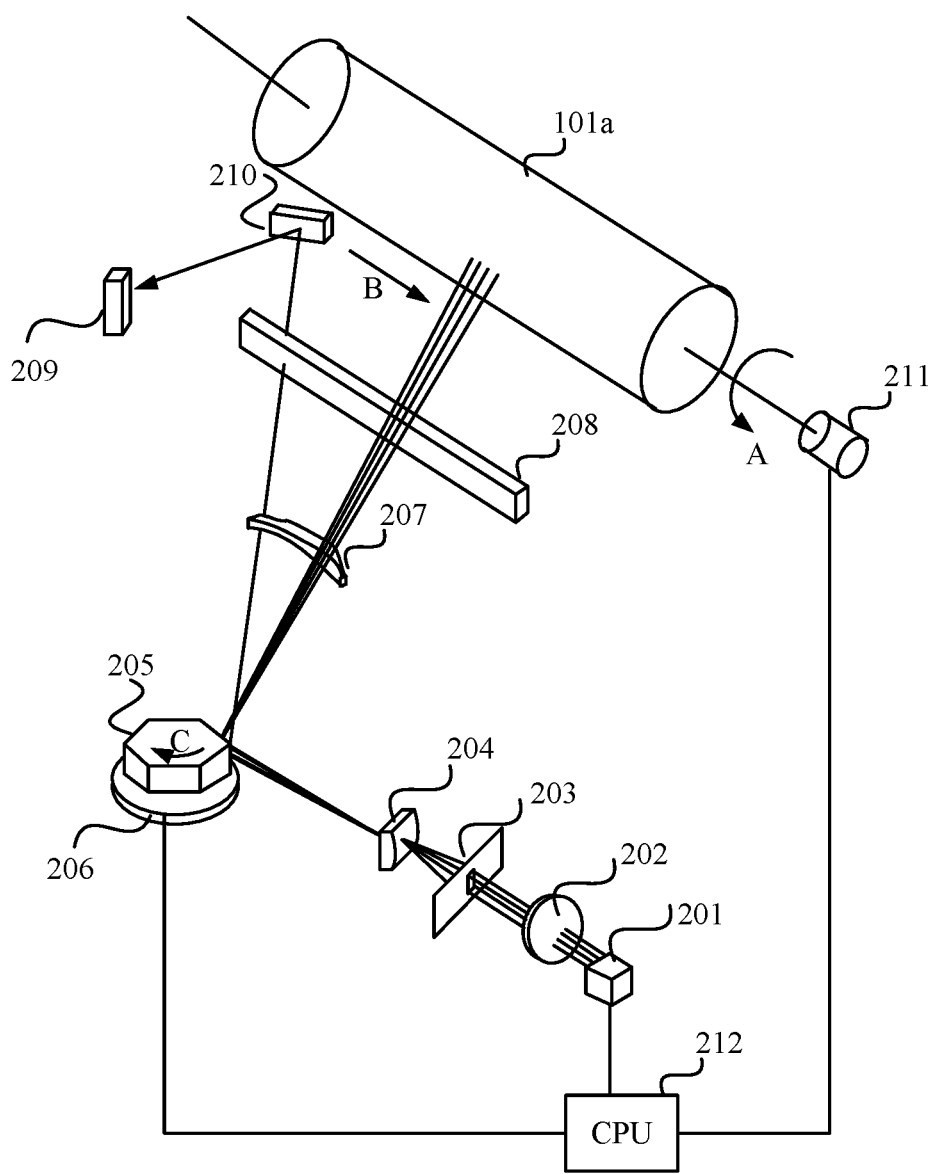
FIG. 1 illustrates a partial structural schematic of an image forming device according to embodiments of the present disclosure.

In order to illustrate objectives, technical solutions and advantages of embodiments of the present application more clearly, the technical solutions in the embodiments of the present application may be clearly and completely described in the following with reference to the drawings in the embodiments of the present application. Obviously, the described embodiments are part of the embodiments, not all of the embodiments, of the present application. The components of the embodiments of the present application, which are described and illustrated in the drawings herein, may be arranged and designed in various different configurations. Therefore, the detailed description of the embodiments of the present application in the drawings may not be intended to limit the scope of the claimed application and may merely represent selected embodiments of the present application. Based on the embodiments of the present applications, all other embodiments obtained by those skilled in the art without creative work are within the protection scope of the present application.

It should be noted that similar reference numerals and letters refer to similar items in the following drawings, and therefore, once an item is defined in a drawing, it is not required to be further defined and illustrated in subsequent drawings.

The image forming device may include a photosensitive drum and a laser scanning unit (LSU). A charged surface of the photosensitive drum may form an electrostatic latent image under the scanning of a laser beam emitted from the LSU.

FIG. 1 illustrates a partial structural schematic of an image forming device according to embodiments of the present disclosure. The image forming device may include a target LSU and a cylindrical photosensitive drum 101a. The target LSU may scan the surface of the photosensitive drum 101a along a primary scanning direction and a secondary scanning direction. The primary scanning direction may be an axial direction of the photosensitive drum 101a (e.g., a direction B shown in FIG. 1), and the secondary scanning direction may be a circumferential direction of a cross section of the photosensitive drum 101a (e.g., a direction A shown in FIG. 1).

In one embodiment, the target LSU may include a laser source 201, a collimating lens 202, a grating 203, a cylindrical lens 204, a polygon mirror 205, a curved lens 207, a diffractive optical element 208, and a motor 206 for driving the polygon mirror 205. The laser source 201 may be a semiconductor laser, such as a laser diode (LD). The LD may be used to emit a laser beam driven by a LD drive unit. The polygon mirror 205 may include a plurality of reflective surfaces. The laser beam emitted from the laser source 201 may sequentially pass through the collimating lens 202, the grating 203, the cylindrical lens 204 to reach a certain reflective surface of the polygon mirror 205 and may be reflected by the reflective surface, and then sequentially pass through the curved lens 207 and the diffractive optical element 208 to reach the surface of the photosensitive drum 101a, thereby forming an electrostatic latent image.

The collimating lens 202 may be used to convert the laser beam emitted from the laser source 201 into collimated light, and the grating 203 may be used to limit the luminous flux of the laser beam. The cylindrical lens 204 may have a specific reflective index in the secondary direction, such that the luminous flux passing through the grating 203 may form an elliptical image on the reflective surface of the polygon mirror 205. The primary axis of the elliptical image may be in the above-mentioned primary scanning direction.

The polygon mirror 205 may be rotated by the motor 206 along a specific direction under the control of the motor drive unit, such as a direction C in FIG. 1. As the polygon mirror 205 rotates, an incident angle of the laser beam on the reflective surface of the polygon mirror 205 may change constantly. Correspondingly, an incident position of the laser beam reflected by the reflective surface of the polygon mirror 205 to the surface of the photosensitive drum 101a may move along the primary scanning direction, thereby implementing scanning along the primary scanning direction, that is, row scanning. In one embodiment, when the polygon mirror 205 rotates a reflective surface each time, the laser beam may scan from one end to the other end of the photosensitive drum in the primary scanning direction, that is, one row scanning may be completed. Furthermore, the photosensitive drum 101a may rotate by a drive unit 211, such that the laser beam may move along the secondary scanning direction.

LSUs designed by different manufacturers may have different specifications. For example, a quantity of the reflective surfaces of the polygon mirrors in LSUs may be inconsistent. On one hand, in order to make a quantity of scanned rows in a same time period to be same, when the quantity of the reflective surfaces of the polygon mirrors is different, the motor speeds of the LSUs may be different. On another hand, when an optical path remains unchanged, the LSUs having a relatively small quantity of the reflective surfaces of the polygon mirror may have a lower effective scanning rate, so video data required for the LSUs may be delivered at a higher frequency. Before starting each row scanning, a central processing unit (CPU) of the image forming device may deliver a row video data corresponding to such row scanning to the LD drive unit. When receiving the row video data, the LD drive unit may start driving the LD to emit the laser beam.

On another hand, in order to achieve a specific print density, that is, to make the exposure energy of one scanning dot of the photosensitive drum 101a to reach a specific value, the LSUs having a higher frequency of delivering the video data may be required to have a higher optical power because the exposure energy of one scanning dot may be equal to the product of the exposure time of one scanning dot and the optical power, and the higher frequency of delivering the video data may indicate a shorter exposure time of one scanning dot.

It can be seen that, for LSUs with different quantities of the reflective surfaces of the polygon mirrors, it is required to control each device according to different control parameters. Base on the above-mentioned description, the embodiments of the present application provide the LSU identification method and the image forming device for automatically identifying LSUs having different quantities of reflective surfaces of polygon mirrors, and configuring different control parameters according to identification results, thereby implementing automatic compatibility with LSUs with different specifications.

Figure 2:
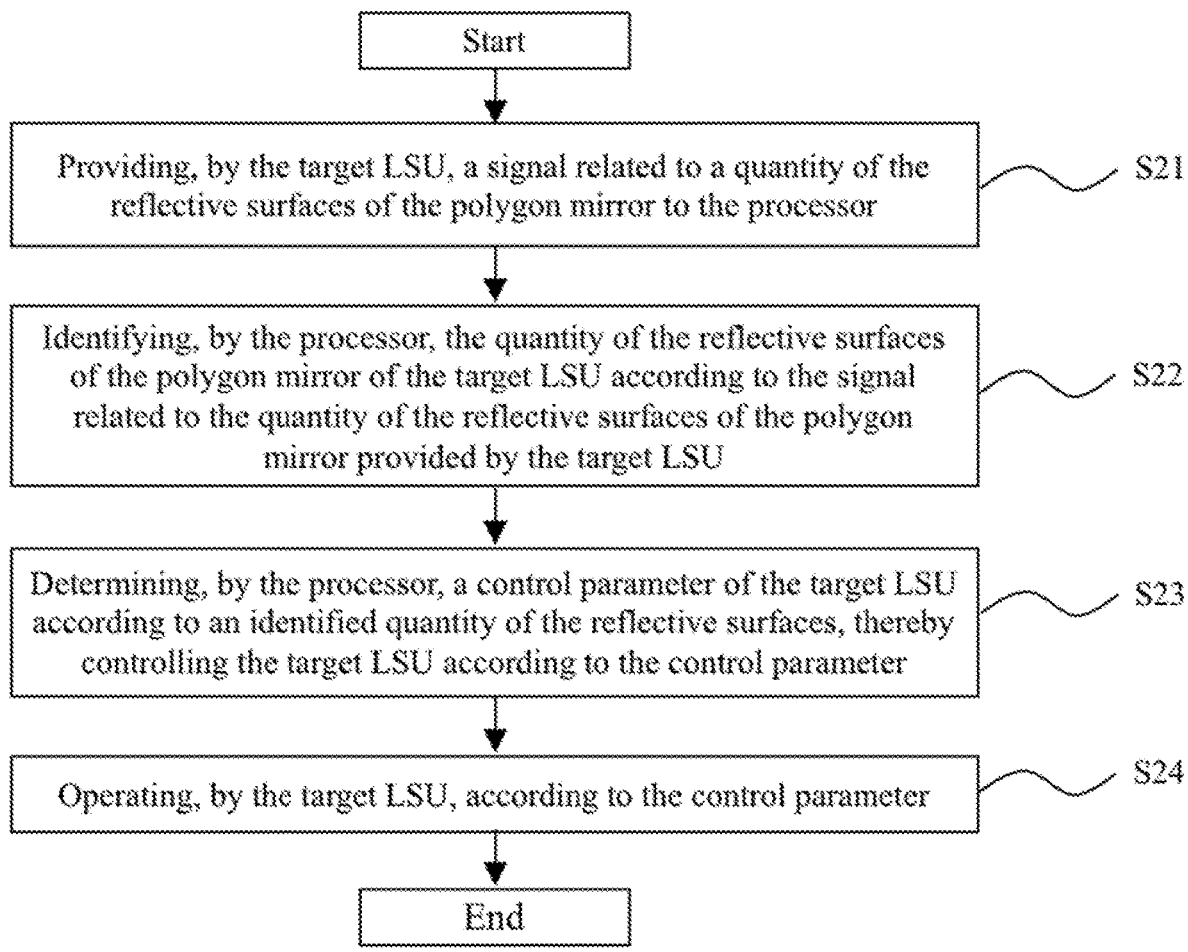
FIG. 2 illustrates a flow chart of an LSU identification method according to embodiments of the present disclosure.

FIG. 2 illustrates a flow chart of the LSU identification method according to embodiments of the present disclosure, and the method may be applied to the image forming device in FIG. 1. The target LSU of the image forming device is the LSU currently installed on the image forming device. Exemplary steps included in the method are described below.

In S21, the target LSU may provide a signal related to the quantity of the reflective surfaces of the polygon mirror 205 to a processor 212.

In S22, the processor 212 may identify the quantity of the reflective surfaces of the polygon mirror 205 of the target LSU according to the signal related to the reflective surfaces of the polygon mirror 205 provided by the target LSU.

In one embodiment, the target LSU may be one of at least two LSUs types having different quantities of the reflective surfaces of the polygon mirrors 205. Different types of LSUs may provide different signals related to the quantities of the reflective surfaces of the polygon mirrors. Therefore, the quantity of the reflective surfaces of the polygon mirror 205 of the target LSU may be identified based on the signal transmitted by the currently installed LSU (e.g., the target LSU).

Optionally, in one embodiment, exemplary step S22 may be executed when the image forming device is powered on. It should be understood that, in other embodiments, the execution of step S22 may be triggered by other triggering instructions, such as a button instruction, and the like.

Optionally, the signal related to the quantity of the reflective surfaces of the polygon mirror 205 may be acquired by the processor 212 in real-time; or the signal related to the quantity of the reflective surfaces of the polygon mirror 205 may be acquired by the processor 212 in a single time and then be stored in the memory of the target LSU, or may be acquired by a user in advance and stored in the memory of the target LSU, or may be stored in the memory of the target LSU by manufacturer in advance.

When the signal related to the quantity of the reflective surfaces of the polygon mirror 205 is stored in the memory, step S22 may be implemented by the following exemplary step:

the quantity of the reflective surfaces of the polygon mirror 205 of the target LSU may be determined according to the signal related to the quantity of the reflective surfaces of the polygon mirror 205 and stored by the memory of the target LSU.

In step S23, the processor 212 may determine a control parameter of the target LSU according to an identified quantity of the reflective surfaces, thereby controlling the target LSU according to the control parameter.

In step S24, the target LSU may operate according to the control parameter.

The processor 221 may store control parameters corresponding to different quantities of the reflective surfaces. The control parameters may include parameter data, such as a motor speed, an optical power, an video data delivery frequency, and the like.

In one embodiment, the target LSU may provide the signal related to the quantity of the reflective surfaces of the polygon mirror 205 through different manners, which may be described in detail hereinafter.

Referring to FIG. 1, in one embodiment, the target LSU may further include a beam detector 209 and a reflective mirror 210. The arrangement position of the reflective mirror 210 may correspond to a specific position on each reflective surface of the polygon mirror 205. When the laser beam is incident on the specific position of any reflective surface of the polygon mirror 205, the laser beam reflected by the reflective surface of the polygon mirror 205 may be received by the reflective mirror 210. Then the received laser beam may be reflected by the reflective mirror 210 to the beam detector 209. After detecting the laser beam, the beam detector 209 may transmit an initial scan signal to the central processing unit 212 of the image forming device, and the initial scan signal may be referred to as a row synchronization signal. The above-mentioned specific position may correspond to a position before the start of the row scanning. Before scanning each row (e.g., scanning each row of video data), the LD may be controlled to emit the laser beam. If receiving the initial scan signal transmitted by the beam detector 209, the processor 212 may deliver such row video data to be scanned to the LD drive unit after a certain duration. In such way, the initial point of each row scan may be located.

Figure 3:
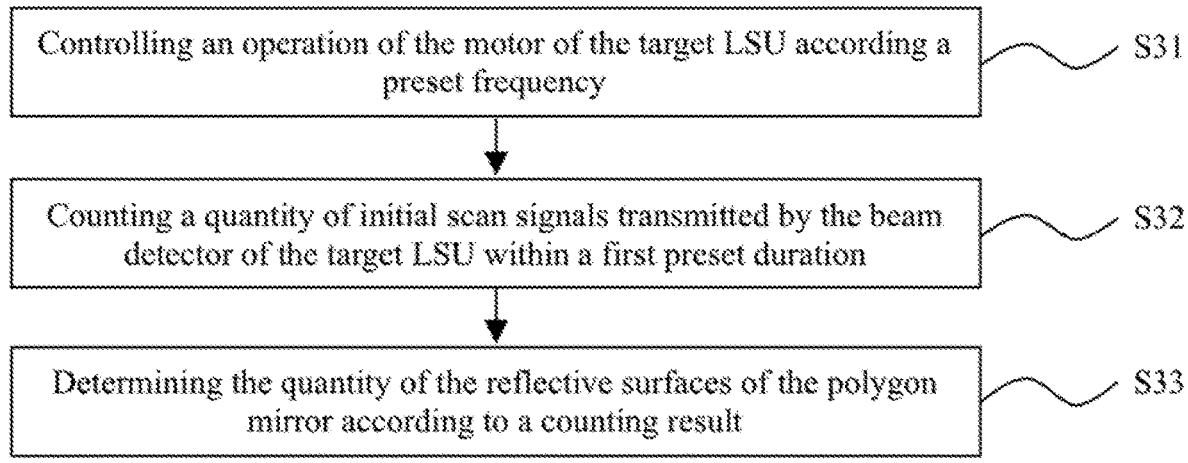
FIG. 3 illustrates a schematic of sub-steps of a step S22 in FIG. 2.

Based on the above-mentioned description, in one embodiment, the signal related to the quantity of the reflective surfaces of the polygon mirror 205 may be provided by the beam detector 209 of the target LSU. Correspondingly, step S22 may include the following exemplary sub-steps shown in FIG. 3.

In step S31, the motor 206 for controlling the target LSU may operate according a preset frequency.

In step S32, the quantity of initial scan signals transmitted by the beam detector 209 of the target LSU within a first preset duration may be counted.

In step S33, the quantity of the reflective surfaces of the polygon mirror 205 may be determined according to a counting result.

In one embodiment, for the motor 206 rotates one turn (circle), the quantity of rotated reflective surfaces of the polygon mirror 205 may be the included quantity of the reflective surfaces. For example, if the polygon mirror 205 is a five-sided mirror, for the motor 206 rotates one turn, the polygon mirror 205 may rotate five reflective surfaces. For another example, if the polygon mirror 205 is a four-sided mirror, for the motor 206 rotates one turn, the polygon mirror 205 may rotate four reflective surfaces. The quantity of rotated reflective surfaces of the polygon mirror 205 may be equal to the quantity of scanned rows. When each row of video data is scanned, the beam detector 209 may transmit an initial scan signal to the processor 212. Therefore, when the rotation speed of the motor 206 is constant, if the quantity of the reflective surfaces of the polygon mirror 205 of the target LSU is different, the quantity of initial scan signals received by the processor 212 in a certain duration may also be different.

Based on the above-mentioned description, in one embodiment, the motor 206 may be controlled to operate according to the preset frequency (preset speed), thereby detecting the quantity of initial scan signals transmitted by the bream detector 209 of the target LSU within a first present duration.

Optionally, the preset frequency may be configured according to actual conditions, and may be, for example, about 10000-30000 r/m, that is, 10000-30000 rotations per minute. The present frequency may be, for example, about 200000 r/m. The first preset duration may be configured according to actual conditions, and may be, for example, about 0.5 second to 1.5 second. The first present duration may be, for example, about 1 second.

In the implementation, the quantity of initial scan signals transmitted by the beam detector of at least two LSU types during the first present duration may be respectively calculated when the motor rotates at the preset frequency. For example, if the motor rotates at 10000 r/m, the preset duration is 1 second, and the at least two LSU types includes a four-sided mirror and a five-sided mirror, it may be determined that the motor may rotate 166.667 r in one second. Then, for the four-sided mirror, the quantity of initial scan signals transmitted by the beam detector to the processor 212 in one second may be 166.667*4=666.7; and for the five-sided mirror, the quantity of initial scan signals transmitted by the beam detector to the processor 212 in one second may be 166.667*5=833.3.

In the implementation, a middle value 750 of 666.7 and 833.3 may be stored as a threshold in the processor 212. Then, step S33 may be implemented by the following exemplary step:

the relationship between the counted number and 750 may be determined; if the counted number is greater than 750, the polygon mirror 205 of the target LSU may be a five-sided mirror; and if the counted number is less than 750, the polygon mirror 205 of the target LSU may be a four-sided mirror.

Of course, other values between 666.7 and 833.3 may also be used as the threshold, which may not be limited in one embodiment.

It should be understood that the four-sided mirror and the five-sided mirror may be merely exemplary. The LSU identification method provided in one embodiment may be used to identify LSUs having other quantities of reflective surfaces of the polygon mirrors.

Figure 4:
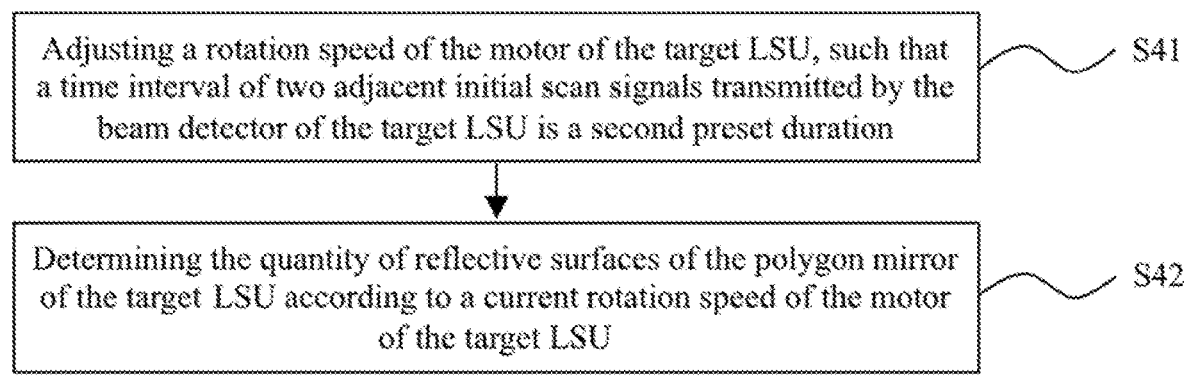
FIG. 4 illustrates another schematic of sub-steps of a step S22 in FIG. 2.

Based on the implementation principle in one embodiment, if the interval durations of two adjacent row scans are consistent, that is, the time interval of two adjacent initial scan signals transmitted by the beam detector is consistent, the motor speeds may be different when the quantities of reflective surfaces of the polygon mirrors of the LSUs are different. Therefore, in another embodiment, the target LSU may provide the signal related to the reflective surfaces of the polygon mirror 205 through the motor 206. Correspondingly, step S22 may include the following exemplary sub-steps shown in FIG. 4.

In step S41, the rotation speed of the motor 206 of the target LSU may be adjusted, such that the time interval of two adjacent initial scan signals transmitted by the beam detector may be a second preset duration.

Optionally, the second preset duration may be configured according to the print speed set on the image forming device, which may not be limited in one embodiment.

In step S42, the quantity of the reflective surfaces of the polygon mirror 205 of the target LSU may be determined according to the current rotation speed of the motor 206 of the target LSU.

In the implementation, motor rotation speeds (or rotation speed ranges) of at least two LSU types may be pre-calculated and saved in the processor 212 when the time interval of two adjacent initial scan signals transmitted by the beam detector is the second preset duration. In such way, when the time interval of two adjacent initial scan signals transmitted by the beam detector of the target LSU is the second preset duration, the processor 212 may search the LSU type corresponding to the current rotation speed of the motor 206 of the target LSU, thereby determining the reflective surfaces of the polygon mirror of such LSU type.

As mentioned above, the beam detector of the target LSU may be electrically connected to the processor 212, that is, the beam detector of any type of the LSUs installed on the image forming device may be electrically connected to the processor 212. Therefore, in another embodiment, hardware structures of at least two LSU types may be modified, such that the beam detectors of at least two LSU types may output different levels of target signals to the processor 212. In such case, the target signal may be served as the signal related to the quantity of the reflective surfaces of the polygon mirror in one embodiment.

Correspondingly step S22 may be implemented by the following exemplary step:

the quantity of the reflective surfaces of the polygon mirror 205 of the target LSU may be determined according to the target signal level outputted by the beam detector 209 of the target LSU.

It should be noted that the above-mentioned embodiments may be used to identify two LSU types simultaneously. In one embodiment, manners for outputting different levels of target signals to the processor 212 by the beam detectors of two LSU types may be various.

In one embodiment, the two LSU types may include a first LSU and a second LSU. The beam detector of the first LSU may include a first comparator. For a non-inverting input terminal and an inverting input terminal of the first comparator, one input terminal may be used to receive a preset voltage, and the other input terminal may be used to receive a comparison voltage. The first comparator may be used to output a target signal according to the magnitude relationship between the comparison voltage and the preset voltage.

The beam detector of the second LSU may include a second comparator. For a non-inverting input terminal and an inverting input terminal of the second comparator, one input terminal may be used to receive a preset voltage, and the other input terminal may be used to receive a comparison voltage. In addition, the non-inverting input terminal of the second comparator and the inverting input terminal of the first comparator may be both used to receive the preset voltage, or both used to receive the comparison voltage. In other words, the inverting input terminal of the second comparator and the non-inverting input terminal of the first comparator may be both used to receive the preset voltage, or both used to receive the comparison voltage. The second comparator may be used to output a target signal according to the magnitude relationship between the comparison voltage and the preset voltage.

When the connected beam detector detects the beam, the comparison voltage may be greater than the preset voltage; and when the connected beam detector does not detect the beam, the comparison voltage may be less than the preset voltage.

Figure 5:
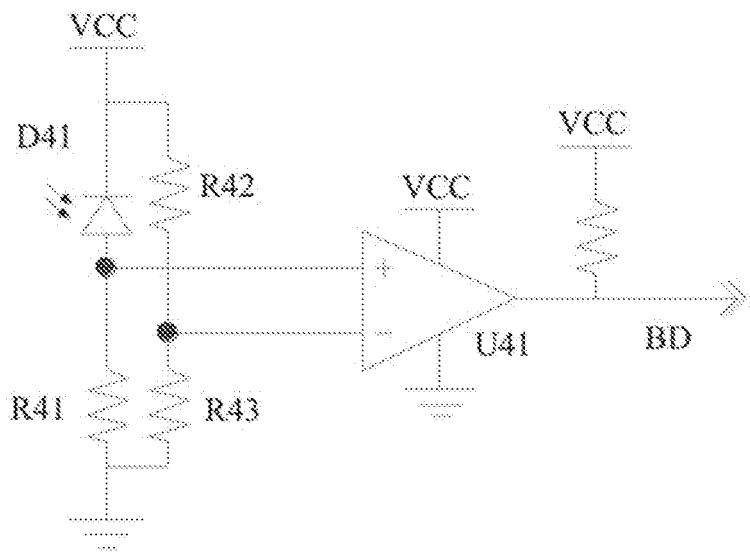
FIG. 5(a) illustrates a circuit diagram of a beam detector of a first LSU according to embodiments of the present disclosure.
FIG. 5(b) illustrates a circuit diagram of a beam detector of a second LSU according to embodiments of the present disclosure.
Figure 5:
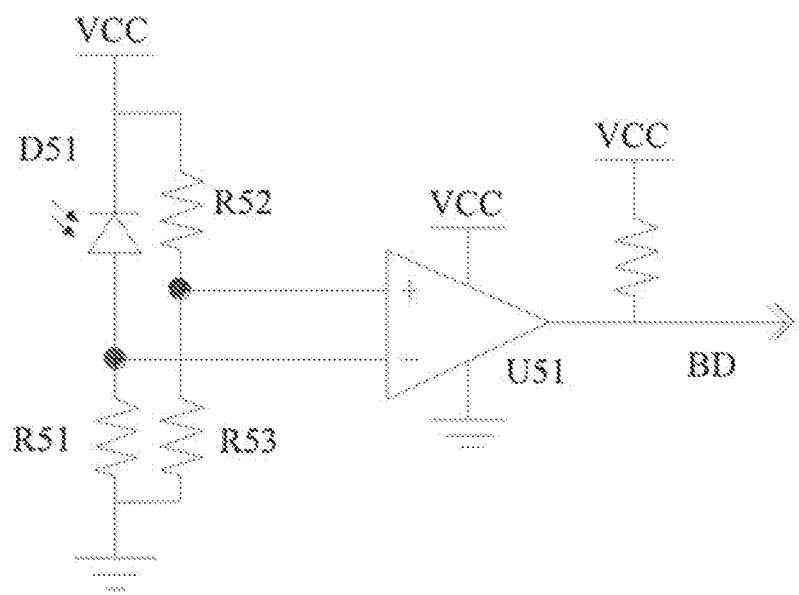

For example, referring to FIG. 5(a) and FIG. 5(b), FIG. 5(a) exemplarily illustrates a circuit diagram of a beam detector of a first LSU, and FIG. 5(b) exemplarily illustrates a circuit diagram of a beam detector of a second LSU.

As shown in FIG. 5(a), the beam detector of the first LSU may include a first comparator U41, and a first branch and a second branch in parallel between a power source VCC and a ground. The first branch may include a resistor R41 and a photodiode D41 in series. The photodiode D41 may be connected to the power source VCC, and the resistor R41 may be connected to the ground. The second branch may include a resistor R42 and a resistor R43 in series. For the resistor R42 and the resistor R43, one resistor may be connected to the power source VCC and the other resistor may be connected to the ground.

The inverting input terminal of the first comparator U41 may be connected between the resistor R42 and the resistor R43. The input voltage of the inverting input terminal of the first comparator U41 may be a voltage across the resistor R43:

$$\frac{R_{43}}{R_{42} + R_{43}} * VCC,$$

which may serve as the preset voltage in one embodiment.

The non-inverting input terminal of the first comparator U41 may be connected between the resistor R41 and the photodiode D41, and the input voltage may be a voltage across the resistor R41 and may serve as the comparison voltage in one embodiment. The photodiode D41 may be conducting when the beam is detected, so the voltage across the resistor R41 may be VCC, substantially. That is, the voltage of the non-inverting input terminal of the first comparator U41 may be greater than the input voltage of the inverting input terminal, and currently, a BD signal (e.g., a target signal, serving as an initial scan signal) outputted by the first comparator may be at a high level. The photodiode D41 may be cutoff when no beam is detected, so voltage across the resistor R41 may be 0. That is, the voltage of the non-inverting input terminal of the first comparator U41 may be less than the voltage of the inverting input terminal, and currently, a BD signal outputted by the first comparator may be at a low level.

As shown in FIG. 5(b), the beam detector of the second LSU may include a second comparator U51, and a third branch and a fourth branch in parallel between a power source VCC and a ground. The third branch may include a resistor R51 and a photodiode D51 in series. The photodiode D51 may be connected to the power source VCC, and the resistor R51 may be connected to the ground. The fourth branch may include a resistor R52 and a resistor R53 in series. For the resistor R52 and the resistor R53, one resistor may be connected to the power source VCC and the other resistor may be connected to the ground. It should be understood that the resistor R51 and the resistor R41, the resistor R52 and the resistor R42, and the resistor R53 and the resistor R43 may have a same resistance value and may also have different values.

The non-inverting input terminal of the second comparator U51 may be connected between the resistor R52 and the resistor R53, and the input voltage may be a voltage across the resistor R53, which may serve as the preset voltage.

The inverting input terminal of the second comparator U51 may be connected between the resistor R51 and the photodiode D51, and the input voltage may be a voltage across the resistor R51 and may serve as the comparison voltage. In the implementation, if the beam is detected by the photodiode D51, the input voltage of the inverting input terminal of the second comparator U51 may be VCC substantially, and may be greater than the input voltage of the non-inverting input terminal, so a BD signal (e.g., a target signal) outputted by the second comparator U51 may be at a low level. If no beam is detected by the photodiode D51, the input voltage of the inverting input terminal of the second comparator U51 may be 0, and may be less than the input voltage of the non-inverting input terminal, so a BD signal outputted by the second comparator U51 may be at a high level.

Based on the above-mentioned design, different levels of target signals may be outputted by the beam detectors of the first LSU and the second LSU.

In the implementation, step S22 may be executed when the power is turned on. When the power is turned on, the beam detector may be idle, that is, no beam may be detected by the beam detector. Therefore, when the target signal outputted by the beam detector 209 of the target LSU is detected to be a low level by the processor 212, the target LSU may be determined to the first LSU; when the target signal outputted by the beam detector 209 of the target LSU is detected to be a high level by the processor 212, the target LSU may be determined to the second LSU.

It should be understood that the types of the first LSU and the second LSU may not be limited in one embodiment. For example, for the LSU including the four-sided mirror and the LSU including the five-sided mirror, the beam detector of the LSU including the four-sided mirror may be configured according to any one of FIG. 5(a) and FIG. 5(b), and the beam detector of the LSU including the five-sided mirror may be configured according to the other one of FIG. 5(a) and FIG. 5(b).

In another implementation, the beam detectors of the first LSU and the second LSU may both include a third comparator. For the non-inverting input terminal and the inverting input terminal of the third comparator, one terminal may be used to receive a preset voltage and the other terminal may be used to a comparison voltage. When the connected beam detector detects the beam, the comparison voltage may be greater than the preset voltage; and when the connected beam detector does not detect the beam, the comparison voltage may be less than the preset voltage. The third comparator may be used to output a target signal according to the magnitude relationship between the comparison voltage and preset voltage.

The processor 212 may have an enable signal output terminal which may be electrically connected to the output terminal of the third comparator of the second LSU through a control circuit; and the control circuit may be used to change the level of the output terminal of the third comparator of the second LSU after receiving the enable signal outputted by the enable signal output terminal.

In such case, step 22 may further include:

before determining the quantity of the reflective surfaces of the polygon mirror of the target LSU according to the level of the target signal outputted by the beam detector of the target LSU, the enable signal may be outputted to the control circuit through the enable signal output terminal.

For example, the beam detector of the first LSU may have a circuit diagram similar to the circuit diagram shown in FIG. 5(b). The comparator U51 may serve as the third comparator of the first LSU. The beam detector of the second LSU may have a circuit diagram similar to the circuit diagram shown in FIG. 6. The beam detector may include a comparator U71, and a fifth branch and a sixth branch in parallel between the power source VCC and the ground. The comparator U71 may serve as the third comparator of the second LSU.

The fifth branch may include a resistor R71 and a photodiode D71 in series. The resistor R71 may be connected to the ground, and the photodiode D71 may be connected to the power source VCC. The sixth branch may include a resistor R72 and a resistor R73 in series. The inverting input terminal of the comparator U71 may be connected between the resistor R71 and the photodiode D71, and the input voltage may be a voltage across the resistor R71 and may serve as the comparison voltage. The non-inverting input terminal of the comparator U71 may be connected between the resistor R72 and the resistor R73, and the input voltage may be a voltage across the resistor R73 and may serve as the preset voltage.

Figure 6:
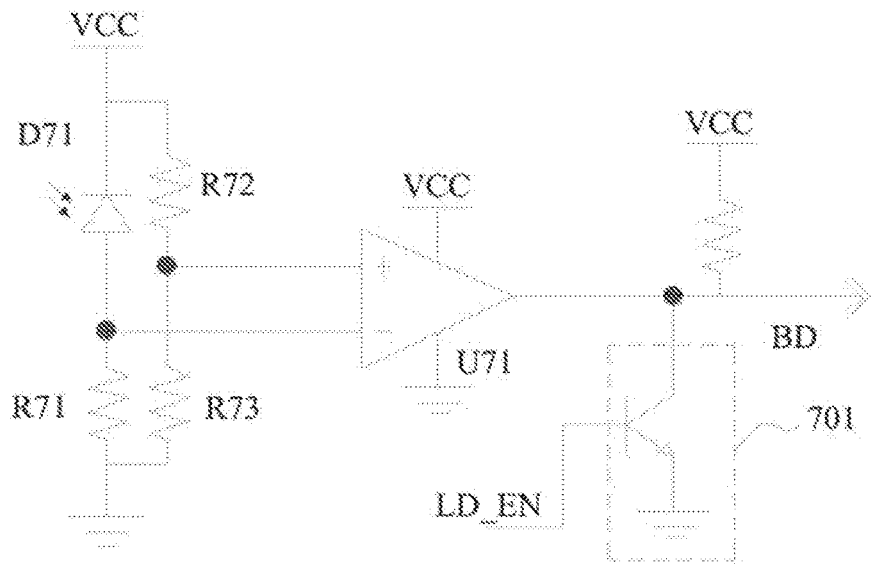
FIG. 6 illustrates another circuit diagram of a beam detector of a second LSU according to embodiments of the present disclosure.

The processor 212 may have a terminal for outputting an LD enable signal (LD_EN), and the terminal may serve as the enable signal output terminal in one embodiment and may be electrically connected to the output terminal of the comparator U71 through a control circuit 701 shown in FIG. 6. Exemplarily, the control circuit 701 may include a triode, where a base of the triode may be connected to the terminal of the processor 212 for outputting the LD enable signal, and an emitter may be connected to the ground. As shown in FIG. 6, the emitter of the triode may be grounded, and a collector may be connected to the output terminal of the comparator U71. In such way, when the photodiode D71 does not detect the beam, the input voltage of the inverting input terminal of the comparator U71 may be less than the input voltage of the non-inverting input terminal, and the target signal outputted by the comparator U71 may be at a high level. When the power is turned on, the processor 212 may output a high level LD_EN signal (LD is turned off when the LD_EN signal is at high level, and LD is turned on when the LD_EN signal is at a low level) to make the triode in the control circuit 701 to be conducting, thereby changing the target signal outputted by the comparator U71 to a low level. After LD is turned on, the LD_EN signal may be at a low level and the triode of the control unit 701 may be cutoff, which may have no effect on the target signal outputted by the comparator U71.

In another embodiment, the signal related to the quantity of the reflective surfaces of the polygon mirror may be provided by the LD drive unit, which may be described in detail hereinafter.

In one embodiment, the LD drive unit may have the enable (LD_EN) terminal and the automatic power control (APC) terminal, which are electrically connected to the processor 212.

In related technologies, the enable terminal may have a first specific level, and the automatic power control terminal may have a second specific level. After the image forming device is at a normal operation mode, the processor 212 may transmit other level signals than the first specific level to the enable terminal and transmit other level signals than the second specific level to the automatic power control terminal.

Based on the above-mentioned description, in one embodiment, the LD drive units of at least two LSU types may be modified, such that the enable terminals of the LD drive units of at least two LSU types may have different levels, and/or the automatic power control terminals of the LD drive units of at least two LSU types may have different levels. After changing the level of any one of the enable terminal and the automatic power control terminal, the operation signal required for the terminal may be modified. Taking the enable terminal as an example, if an original enable terminal has a low level and the required enable signal may be a high level, so the enable signal required by the terminal may be modified to a low level after the enable terminal is modified to have a high level by the present disclosure.

Figure 7:
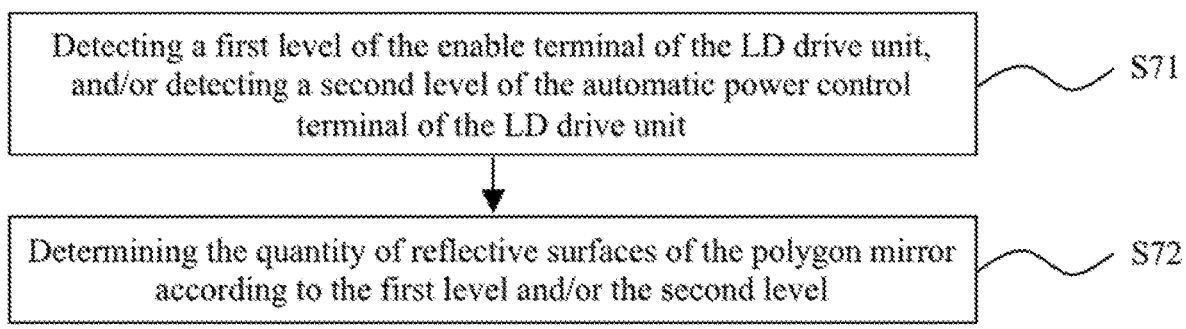
FIG. 7 illustrates another schematic of sub-steps of a step S22 in FIG. 2.

Based on the above-mentioned design, step S22 may include the following exemplary sub-steps shown in FIG. 7.

In step S71, the first level of the enable terminal of the LD drive unit may be detected, and/or the second level of the automatic power control terminal of the LD drive unit may be detected.

In step S72, the quantity of the reflective surfaces of the polygon mirror 205 may be determined according to the first level and/or the second level.

In one embodiment, the first level and/or the second level may correspond to an identifier of the target LSU. The quantity of the reflective surfaces of the polygon mirror 205 may be determined based on the identifier.

At least two LSU types including the first LSU and the second LSU may be taken as an example to illustrate the improvement of the LD drive unit.

Figure 8:
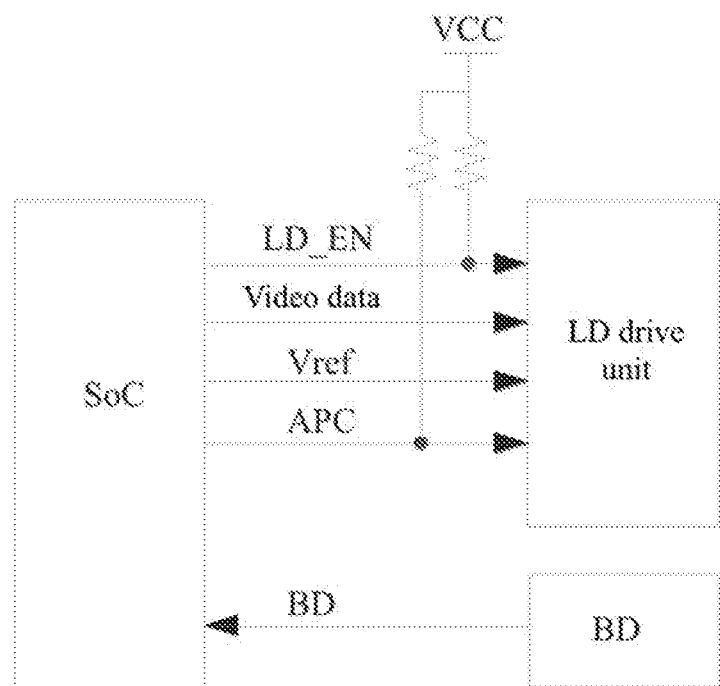
FIG. 8(a) illustrates an electrical connection relationship diagram of an LD drive unit of a first LSU according to embodiments of the present disclosure.
FIG. 8(b) illustrates an electrical connection relationship diagram of an LD drive unit of a second LSU according to embodiments of the present disclosure.
Figure 8:
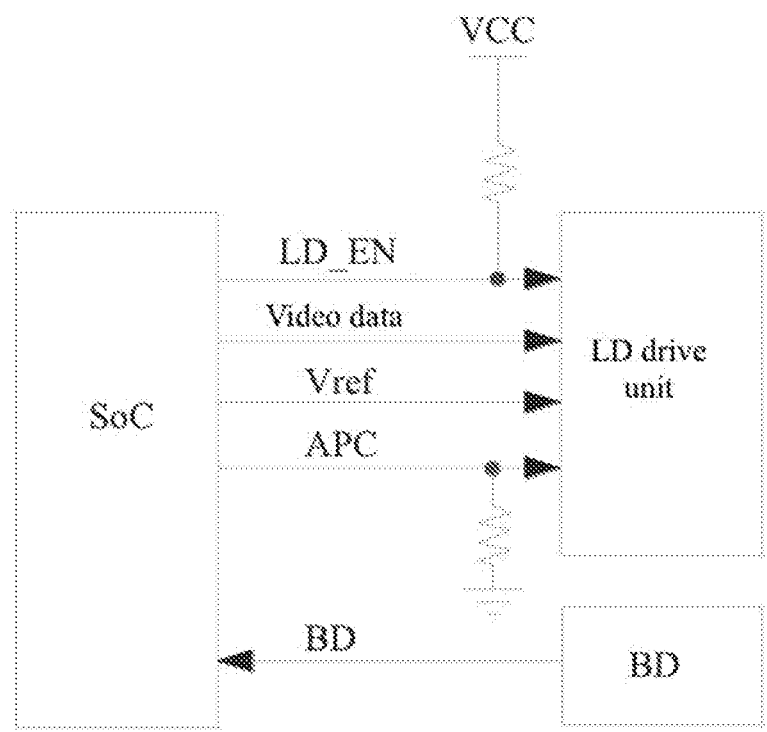

Referring to FIG. 8(a) and FIG. 8(b), FIG. 8(a) exemplarily illustrates an electrical connection relationship diagram of a laser diode of the first LSU and a system-of-chip (SoC). SoC may serve as the processor 212, and the LD_EN terminal of the APC terminal of the LD drive unit may both be connected to the power source VCC, where the identifier for the first LSU may be regarded as 11.

FIG. 8(b) exemplarily illustrates an electrical connection relationship diagram of a laser diode of the second LSU and the SoC. The LD_EN terminal of the LD drive unit may be connected to the power source VCC, and the APC terminal may be connected to the ground, where the identifier for the second LSU may be regarded as 10.

In such way, when the power is turned on (not entering the normal operation mode), if the LD_EN terminal and the APC terminal of the LD drive unit of the target LSU are detected to be at a high level by the SoC, that is, the identifier of the target LSU is 11, the target LSU may be determined to be the first LSU; if the LD_EN terminal of the LD drive unit of the target LSU may be detected to have a high level and the APC terminal of the LD drive unit of the target LSU may be detected to have a low level, that is, the identifier of the target LSU is 10, the target LSU may be determined to be the second LSU.

It should be understood that the types of the first LSU and the second LSU may not be limited in one embodiment. For example, for the LSU including the four-sided mirror and the LSU including the five-sided mirror, the LD drive unit of the LSU including the four-sided mirror may be configured according to any one of FIG. 8(a) and FIG. 8(b), and the LD drive unit of the LSU including the five-sided mirror may be configured according to the other one of FIG. 8(a) and FIG. 8(b).

It should be noted that the above-mentioned case including two LSU types may be merely exemplary. For example, for the LD drive unit, the LD_EN terminal may be configured to be a low level and the APC terminal may be configured to be a high level; or the LD_EN terminal may be configured to be a low level and the APC terminal may be configured to be a low level, which may be used to identify two additional LSU types. Furthermore, the levels of additional terminals may be modified according to the quantity of the LSU types to be identified. For example, for a same LSU type, since the LD drive unit and the motor drive unit are packaged into one single piece, the levels of a motor drive signal and/or a motor speed stabilization signal of the motor drive unit may be further modified, and improvements made without departing from the concept of the present application are within the scope of the present application.

Optionally, in another embodiment, the LSU identification method may be run in the processor 212 as a software function module.

In another embodiment, the quantity of the reflective surfaces included in the polygon mirror 205 of the identified target LSU may also be stored in a memory of the image forming device. Each LSU chip may have specific identification information which may be, for example, a serial number, an identity (ID), and the like. In the implementation, the processor 212 may correlate and store the identified quantity of the reflective surfaces (or information capable of characterizing the quantity of the reflective surfaces) with identification information acquired from the target LSU chip (e.g., the installed LSU). When the installed LSU is required to be identified next time, the identification information of the LSU may be acquired, and whether the identification information is stored may be searched. If there is the stored identification information, the quantity of the reflective surfaces correlated to the identification information (or information for characterizing the quantity of the reflective surfaces) may be directly acquired, and then the control parameters may be determined based on the quantity of the reflective surfaces. In such way, for a same LSU, the LSU identification method may be run only for one time.

Compared with the existing technologies, the embodiments provided by the present disclosure may achieve at least the following beneficial effects.

The embodiments of the present application provide the LSU identification method and the image forming device. The image forming device may include the processor and the target LSU. The LSU may include the LD, the LD drive unit, the polygon mirror and the motor for driving the polygon mirror. The target LSU may be one of at least two LSU types having different quantities of reflective surfaces of the polygon mirrors. The processor may identify the quantity of the reflective surfaces of the polygon mirror of the target LSU according to the signal related to the quantity of the reflective surfaces of the polygon mirror provided by the target LSU, and may determine the control parameters of the target LSU according to the identified quantity of the reflective surfaces, thereby controlling the target LSU of the image forming device according to the control parameters. In such way, the image forming device may automatically identify the specification of the installed target LSU, and further configure the control parameters which may meet the specifications, that is, automatic compatibility with LSUs having different specifications may be implemented.

In the description of the present application, it should also be noted that the terms "configure", "install", "connected", and "connection" are to be understood broadly unless otherwise specifically stated and defined. For example, it may be a fixed connection, a detachable connection, or an integrated connection; it may be a mechanical connection or an electrical connection; it may be a direct connection or indirect connection through an intermediate medium and may be an internal connection between the two elements. The specific meanings of the above-mentioned terms in the present application may be understood in the specific circumstances for those skilled in the art.

In the embodiments provided by the present application, it should be understood that the disclosed device and method may also be implemented in other manners. The device described in above-mentioned embodiments may be merely illustrative. For example, the flow charts and block diagrams in the drawings may illustrate the system architecture, function and operation of possible implementations of devices, methods, and computer program products according to various embodiments of the present application. It should also be noted that, in some alternative implementations, the functions labeled in blocks may also occur in a different order than those illustrated in the drawings. For example, two consecutive blocks may be executed substantially in parallel, and may be executed in the reverse order, depending on the functionality involved. It is also noted that each block of the block diagrams and/or flow charts, and combinations of blocks in the block diagrams and/or flowcharts, may be implemented in a dedicated hardware-based system that performs specified functions or operations, or may be implemented by a combination of dedicated hardware and computer instructions.

It should be noted that, in the context, relational terms such as primary and secondary and the like may be used merely to distinguish one entity or operation from another entity or operation and may not necessarily require or imply such actual relationship or order between the entities or operations. Furthermore, the terms "include", "comprise" or any other variations thereof may be intended to encompass a non-exclusive inclusion, such that a process, a method, an item, or a device which comprises a plurality of elements may not only include such elements, but also include other elements which are not explicitly listed, or may further include elements which are inherent to the process, the method, the item or the device. Without more restrictions, an element defined by the phrase "include one . . . " may not exclude that additional identical elements may be in the process, the method, the item or the device which may include the element.

The above-mentioned disclosed embodiments are exemplary only and are not intended to limit the scope of the present disclosure. Any changes or modifications that are readily conceivable by those skilled in the art within the scope of the present disclosure should be covered by the protection scope of the present disclosure. The scope of the present disclosure is defined by the appended claims and their equivalents.

What is claimed is:

1. A laser scanning unit (LSU) identification method of an image forming device, the image forming device comprising a processor and a target LSU, the target LSU including a laser diode (LD), a laser diode (LD) drive unit, a polygon mirror, and a motor for driving the polygon mirror; and the target LSU being one of at least two LSU types having different quantities of reflective surfaces of the polygon mirrors, the method comprising:

providing, by the target LSU, a signal related to a quantity of the reflective surfaces of the polygon mirror to the processor;

identifying, by the processor, the quantity of the reflective surfaces of the polygon mirror of the target LSU according to the signal related to the quantity of the reflective surfaces of the polygon mirror provided by the target LSU;

determining, by the processor, a control parameter of the target LSU corresponding to the quantity of the reflective surfaces according to the quantity of the reflective surfaces, thereby controlling the target LSU according to the control parameter; and operating, by the target LSU, according to the control parameter.

2. The method according to claim 1, wherein:

each LSU type further includes a memory which stores the signal related to the quantity of the reflective surfaces of the polygon mirror; and identifying, by the processor, the quantity of the reflective surfaces of the polygon mirror of the target LSU according to the signal related to the quantity of the reflective surfaces of the polygon mirror provided by the target LSU includes:

determining the quantity of the reflective surfaces of the polygon mirror of the target LSU according to the signal related to the quantity of the reflective surfaces of the polygon mirror and stored in the memory of the target LSU.

3. The method according to claim 1, wherein:

each LSU type further includes a beam detector, configured to transmit an initial scan signal of each row video data to the processor; and identifying, by the processor, the quantity of the reflective surfaces of the polygon mirror of the target LSU according to the signal related to the quantity of the reflective surfaces of the polygon mirror provided by the target LSU includes:

adjusting a rotation speed of the motor of the target LSU, such that a time interval of two adjacent initial scan signals transmitted by the beam detector of the target LSU is a preset duration; and determining the quantity of reflective surfaces of the polygon mirror of the target LSU according to a current rotation speed of the motor of the target LSU.

4. The method according to claim 1, wherein:

each LSU type further includes a beam detector electrically connected to the processor, wherein beam detectors of the at least two LSU types output different levels of target signals to the processor; and identifying, by the processor, the quantity of the reflective surfaces of the polygon mirror of the target LSU according to the signal related to the quantity of the reflective surfaces of the polygon mirror provided by the target LSU includes:

determining the quantity of the reflective surfaces of the polygon mirror of the target LSU according to a target signal level outputted by the beam detector of the target LSU.

5. The method according to claim 1, wherein:

the LD drive unit includes an enable terminal and an automatic power control terminal, which are configured for electrically connecting to the processor, wherein enable terminals of LD drive units of the at least two LSU types have different levels, and/or automatic power control terminals of the LD drive units of the at the least two LSU types have different levels; and identifying, by the processor, the quantity of the reflective surfaces of the polygon mirror of the target LSU according to the signal related to the quantity of the reflective surfaces of the polygon mirror provided by the target LSU includes:

detecting a first level of the enable terminal of the LD drive unit, and/or detecting a second level of the automatic power control terminal of the LD drive unit; and determining the quantity of reflective surfaces of the polygon mirror according to the first level and/or the second level.

6. A laser scanning unit (LSU) identification method of an image forming device, the image forming device comprising a processor and a target LSU, the target LSU including a laser diode (LD), a laser diode (LD) drive unit, a polygon mirror, and a motor for driving the polygon mirror; and the target LSU being one of at least two LSU types having different quantities of reflective surfaces of the polygon mirrors, the method comprising:

providing, by the target LSU, a signal related to a quantity of the reflective surfaces of the polygon mirror to the processor;

identifying, by the processor, the quantity of the reflective surfaces of the polygon mirror of the target LSU according to the signal related to the quantity of the reflective surfaces of the polygon mirror provided by the target LSU;

determining, by the processor, a control parameter of the target LSU according to an identified quantity of the reflective surfaces, thereby controlling the target LSU according to the control parameter; and operating, by the target LSU, according to the control parameter, wherein:

each LSU type further includes a beam detector, configured to transmit an initial scan signal of each row video data to the processor; and identifying, by the processor, the quantity of the reflective surfaces of the polygon mirror of the target LSU according to the signal related to the quantity of the reflective surfaces of the polygon mirror provided by the target LSU includes:

controlling an operation of the motor of the target LSU according to a preset frequency;

counting a quantity of initial scan signals transmitted by the beam detector of the target LSU within a preset duration; and determining the quantity of the reflective surfaces of the polygon mirror according to a counting result.

7. An image forming device, comprising:

a processor and a target laser scanning unit (LSU), wherein:

the target LSU includes a laser diode (LD), a laser diode (LD) drive unit, a polygon mirror and a motor for driving the polygon mirror; and the target LSU is one of at least two LSU types having different quantities of reflective surfaces of the polygon mirrors; and the processor is configured to: identify a quantity of reflective surfaces of the polygon mirror of the target LSU according to a signal related to the quantity of the reflective surfaces of the polygon mirror provided by the target LSU, and determine a control parameter of the target LSU corresponding to the quantity of the reflective surfaces according to the quantity of the reflective surfaces, thereby controlling the target LSU of the image forming device according to the control parameter.

8. The device according to claim 7, wherein:

each LSU type further includes a memory which stores the signal related to the quantity of the reflective surfaces of the polygon mirror; and when the processor is configured to identify the quantity of the reflective surfaces of the polygon mirror of the target LSU according to the signal related to the quantity of the reflective surfaces of the polygon mirror provided by the target LSU, the processor is configured to:

determine the quantity of the reflective surfaces of the polygon mirror of the target LSU according to the signal related to the quantity of the reflective surfaces of the polygon mirror and stored in the memory of the target LSU.

9. The device according to claim 7, wherein:

each LSU type further includes a beam detector, configured to transmit an initial scan signal of each row video data to the processor; and when the processor is configured to identify the quantity of the reflective surfaces of the polygon mirror of the target LSU according to the signal related to the quantity of the reflective surfaces of the polygon mirror provided by the target LSU, the processor is configured to:

control an operation of the motor of the target LSU according a preset frequency;

count a quantity of initial scan signals transmitted by the beam detector of the target LSU within a preset duration; and determine the quantity of the reflective surfaces of the polygon mirror according to a counting result.

10. The device according to claim 7, wherein:

each LSU type further includes a beam detector, configured to transmit an initial scan signal of each row video data to the processor; and identifying, by the processor, the quantity of the reflective surfaces of the polygon mirror of the target LSU according to the signal related to the quantity of the reflective surfaces of the polygon mirror provided by the target LSU includes:

adjusting a rotation speed of the motor of the target LSU, such that a time interval of two adjacent initial scan signals transmitted by the beam detector of the target LSU is a preset duration; and determining the quantity of the reflective surfaces of the polygon mirror of the target LSU according to a current rotation speed of the motor of the target LSU.

11. The device according to claim 7, wherein:

each LSU type further includes a beam detector electrically connected to the processor, wherein beam detectors of the at least two LSU types output different levels of target signals to the processor; and identifying, by the processor, the quantity of the reflective surfaces of the polygon mirror of the target LSU according to the signal related to the quantity of the reflective surfaces of the polygon mirror provided by the target LSU includes:

determining the quantity of the reflective surfaces of the polygon mirror of the target LSU according to a target signal level outputted by the beam detector of the target LSU.

12. The device according to claim 7, wherein:

each LSU type further includes the LD drive unit including an enable terminal and an automatic power control terminal, which are configured for electrically connecting to the processor, wherein enable terminals and/or automatic power control terminals of the LD drive units of the at least two LSU types have different levels; and identifying, by the processor, the quantity of the reflective surfaces of the polygon mirror of the target LSU according to the signal related to the quantity of the reflective surfaces of the polygon mirror provided by the target LSU includes:

detecting a first level of the enable terminal of the LD drive unit, and/or detecting a second level of the automatic power control terminal of the LD drive unit; and determining the quantity of the reflective surfaces of the polygon mirror according to the first level and/or the second level.

* * * * *